United States Patent [19]

Edwards et al.

[11] Patent Number: 5,052,790
[45] Date of Patent: * Oct. 1, 1991

[54] TELEMICROSCOPIC APPARATUS FOR SIGHTING AND BI-LEVEL VIEWING

[75] Inventors: D. Brandon Edwards; Bruce W. Edwards, both of Virginia Beach; Ian D. Howard, Norfolk; Donald H. Ives, Chesapeake, all of Va.

[73] Assignee: Edwards Optical Corporation, Virginia Beach, Va.

[*] Notice: The portion of the term of this patent subsequent to Oct. 31, 2006 has been disclaimed.

[21] Appl. No.: 401,967

[22] Filed: Sep. 1, 1989

Related U.S. Application Data

[63] Continuation-in-part of Ser. No. 134,794, Dec. 18, 1987, Pat. No. 4,877,316.

[51] Int. Cl.⁵ .................. G02B 23/00; F41G 1/00
[52] U.S. Cl. ............................ 359/399; 33/245; 359/428
[58] Field of Search ............. 350/453, 537, 538, 562, 350/565, 566, 571; 33/243, 245

[56] References Cited

U.S. PATENT DOCUMENTS

| | | |
|---|---|---|
| 1,060,469 | 4/1913 | Mach . |
| 3,173,012 | 3/1965 | de Winter ............... 350/538 |
| 3,187,436 | 6/1965 | Friedrichsmeier ......... 33/243 |
| 3,685,889 | 8/1972 | Thatcher . |
| 3,700,339 | 10/1972 | Steck ...................... 33/233 |
| 3,777,404 | 12/1973 | Oreck ..................... 350/562 |
| 3,787,688 | 1/1974 | Stone ...................... 350/538 |
| 4,108,551 | 8/1978 | Weber ..................... 350/622 |
| 4,196,966 | 4/1980 | Malis . |
| 4,383,741 | 5/1983 | Vogl et al. ............. 350/538 |
| 4,390,249 | 6/1983 | Rusinov et al. ........ 350/453 |
| 4,390,276 | 6/1983 | Budden et al. ......... 33/233 |
| 4,427,259 | 1/1984 | Fjeldsted ............... 350/453 |
| 4,449,787 | 5/1984 | Burbo et al. .......... 350/538 |
| 4,509,282 | 4/1985 | McMillon ............... 33/261 |
| 4,540,238 | 9/1985 | Edwards ................. 350/547 |
| 4,877,316 | 10/1989 | Edwards et al. ....... 350/537 |

FOREIGN PATENT DOCUMENTS

| | | |
|---|---|---|
| 1166663 | 3/1964 | Fed. Rep. of Germany ...... 350/453 |
| 2134158 | 12/1972 | France . |
| 2008272 | 5/1979 | United Kingdom . |

OTHER PUBLICATIONS

"Shiva target alignment and viewing instruments" by J. A. Monjes et al., Optical Engineering, vol. 19, No. 6, pp. 878–882.

"Eccentric Adjustment for Centering Lens" by L. Adams, Jr., IBM Technical Disclosure Bulletin, vol. 20, No. 4, Sep. 1977, p. 1292.

Primary Examiner—Bruce Y. Arnold
Assistant Examiner—Martin Lerner
Attorney, Agent, or Firm—Hamilton, Brook, Smith & Reynolds

[57] ABSTRACT

To provide for bi-level viewing through a miniature Galilean telemicroscope, the telemicroscope is mounted to a carrier such that its optic axis is angled relative to a principal optic axis defined by the carrier. The carrier may be a spectacle lens, an adaptor to be pressure fit to the rear portion of the aiming mechanism or a gun, or an adaptor to be coupled to an optical instrument. The miniature scope may also be used as the principal sight aperture. Where the optical instrument is a larger telescope, an additional cross hair allows for alignment of the telemicroscope. Fibers extending inwardly from the inner surface of the telemicroscope barrel minimize internal light reflection. The telemicroscope barrel is formed of threaded-like coupled portions which may be rotated relative to each other for focusing.

5 Claims, 6 Drawing Sheets

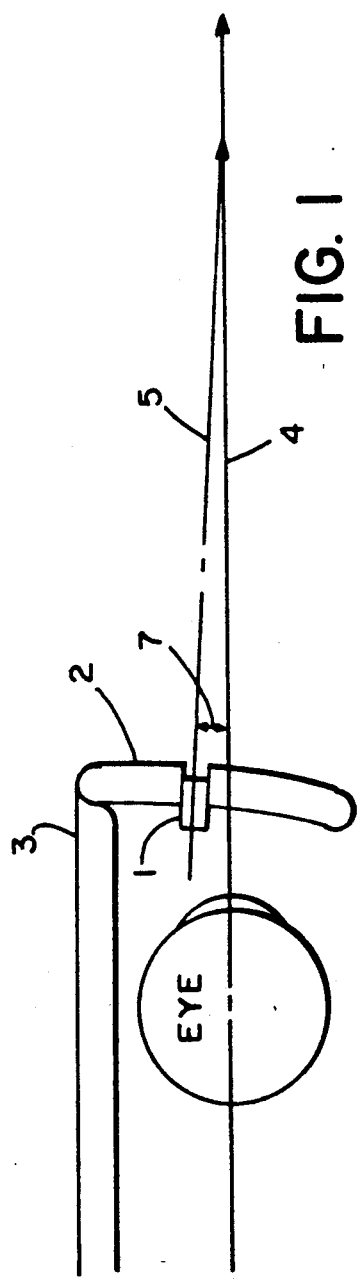
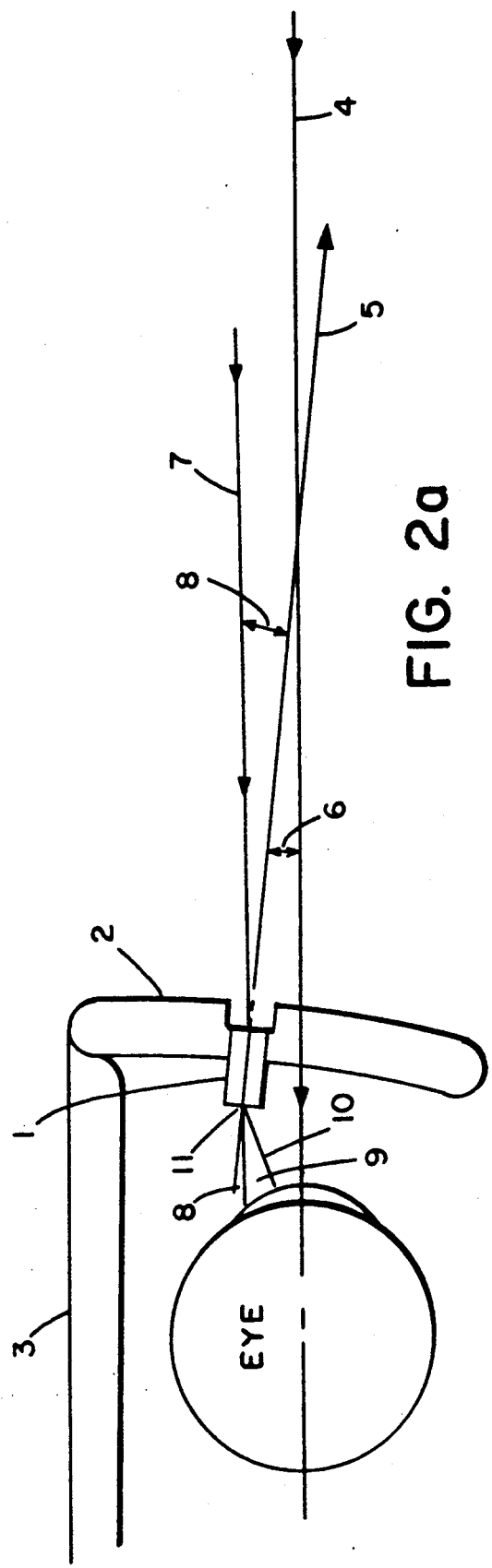

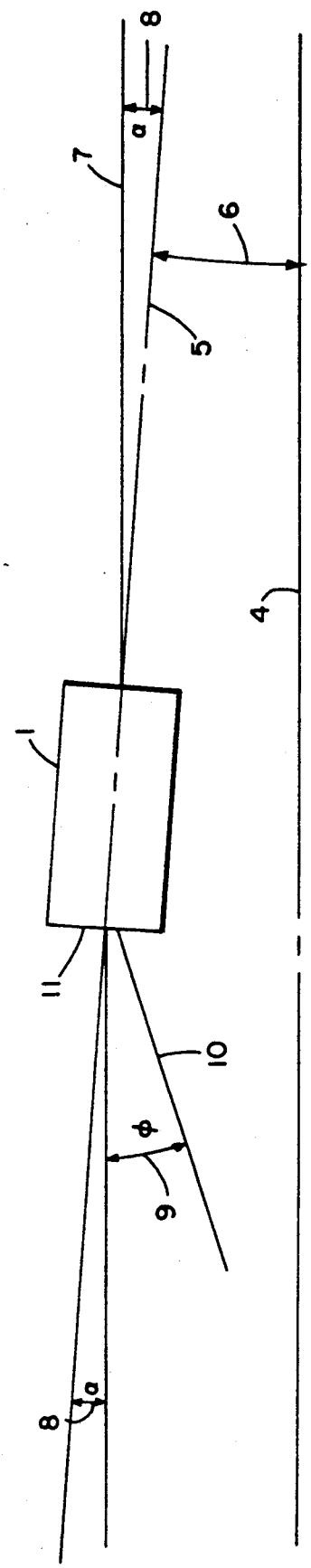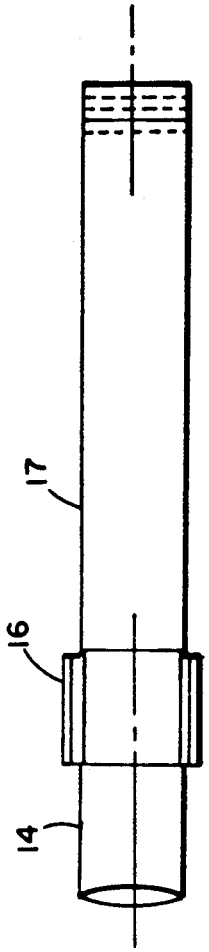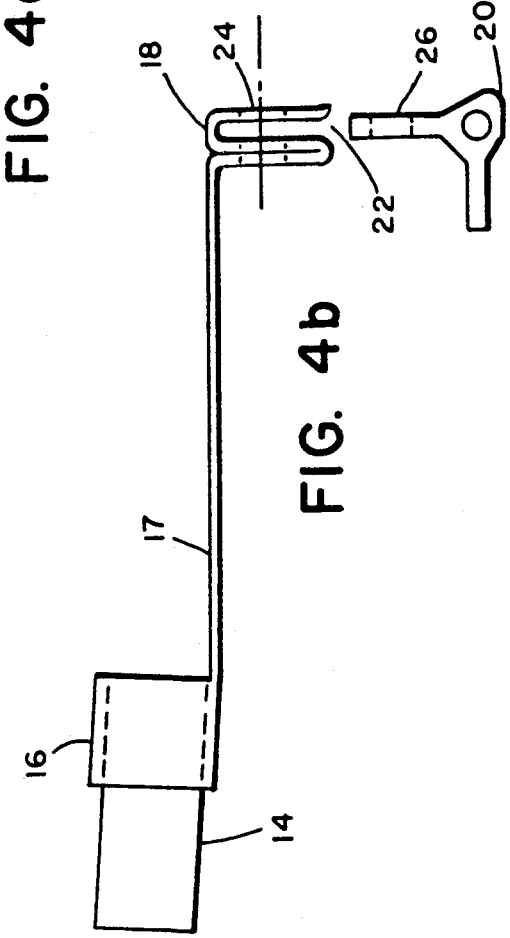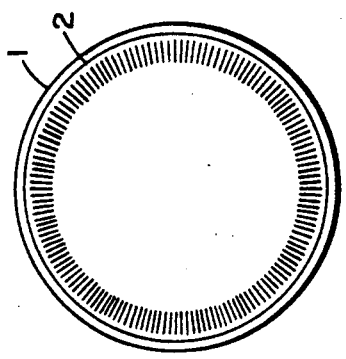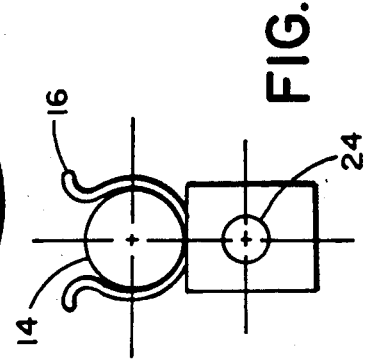

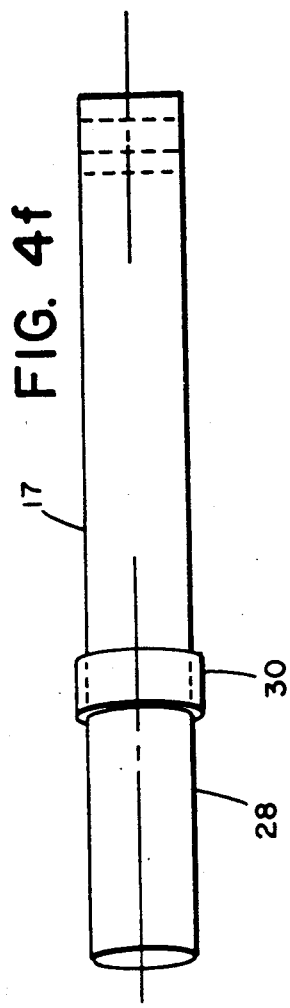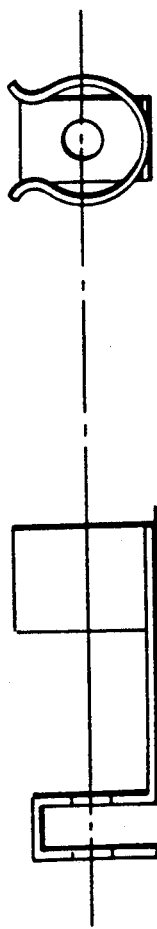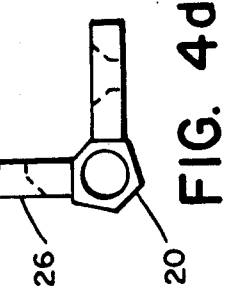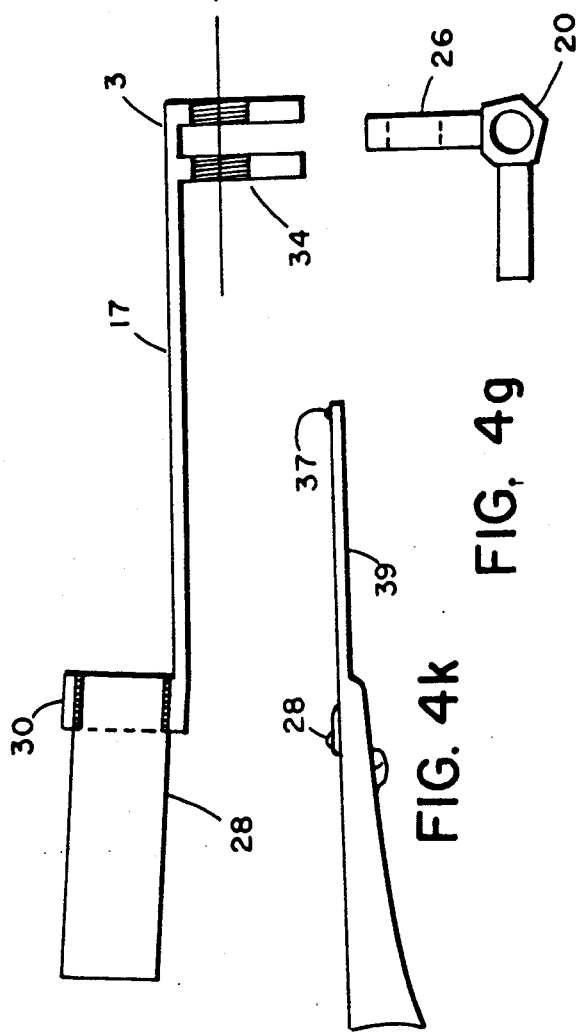

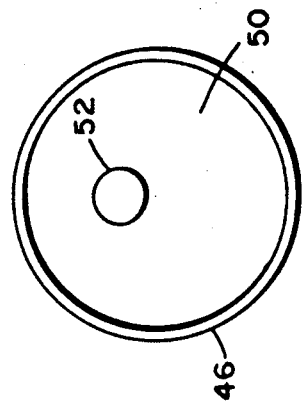
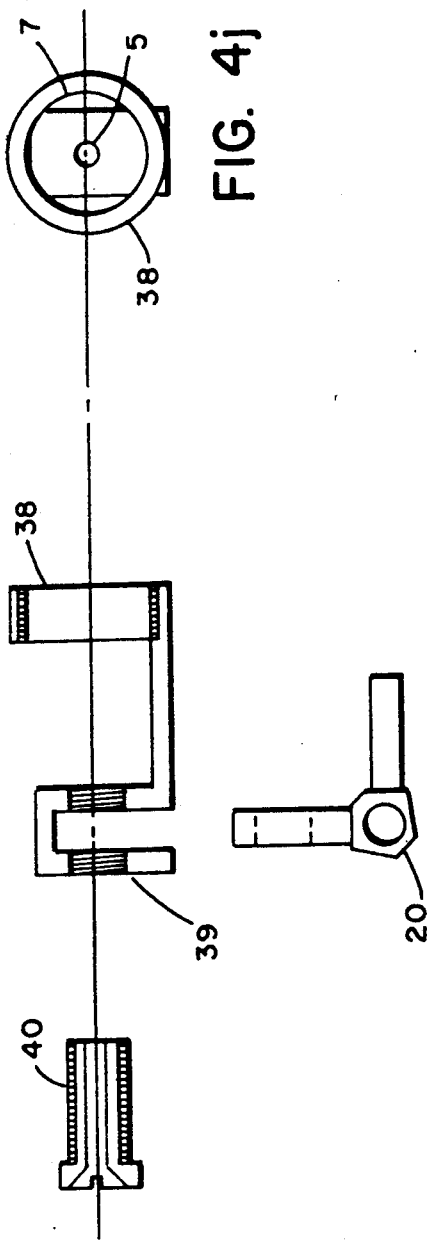
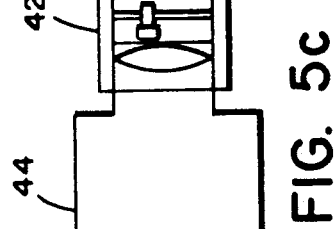
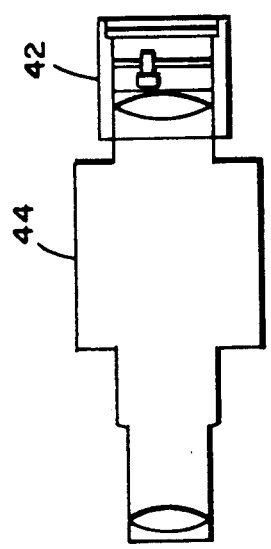
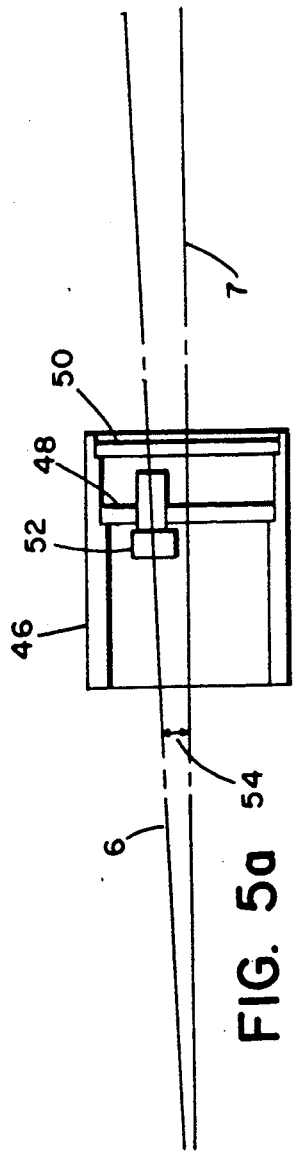

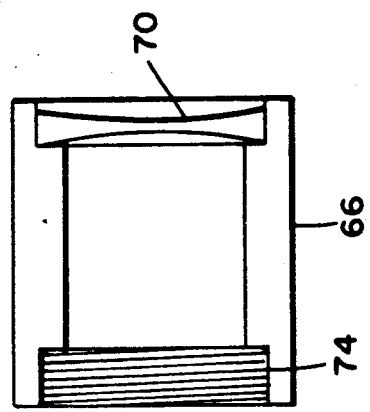
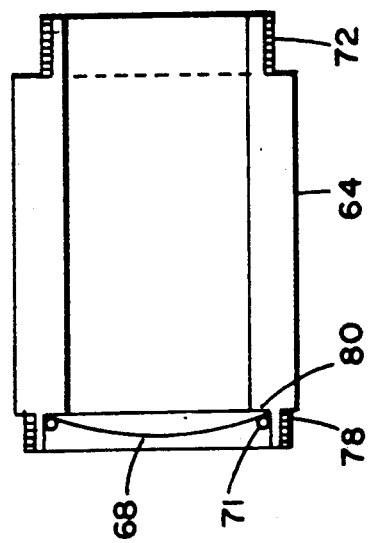
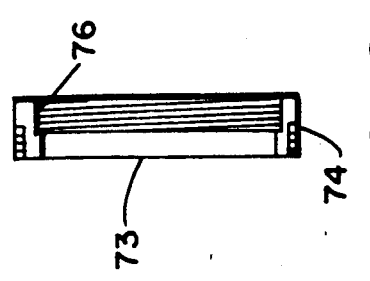
FIG. 6a
FIG. 6b
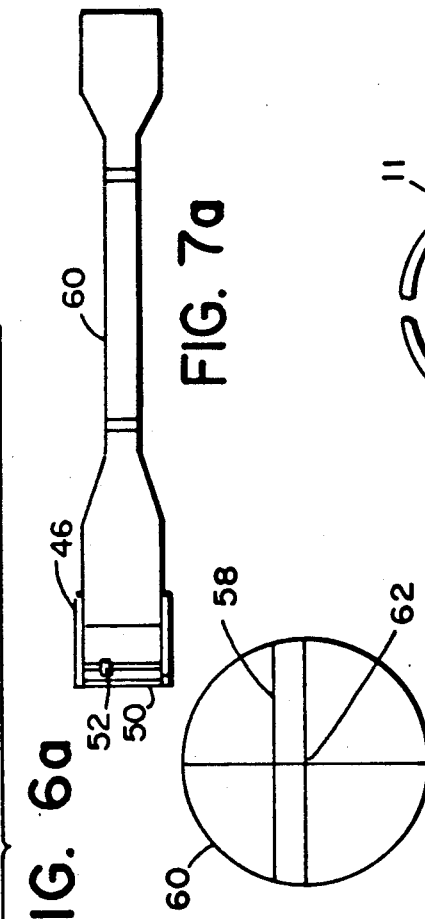
FIG. 7a
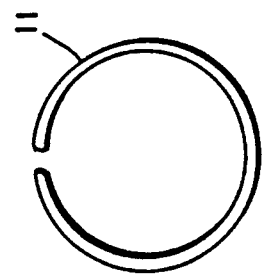
FIG. 6c
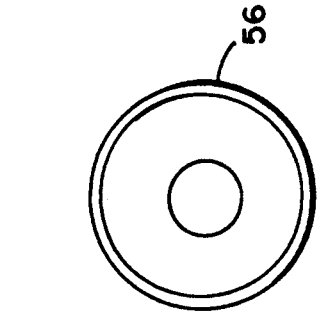
FIG. 7b
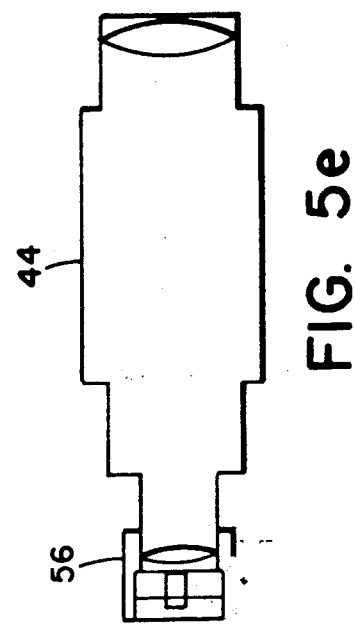
FIG. 5e
FIG. 5d

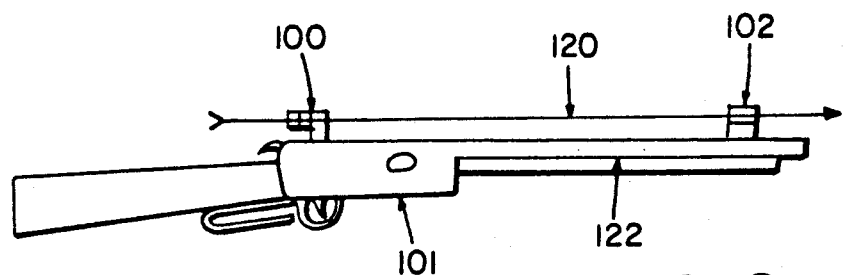
FIG. 8a
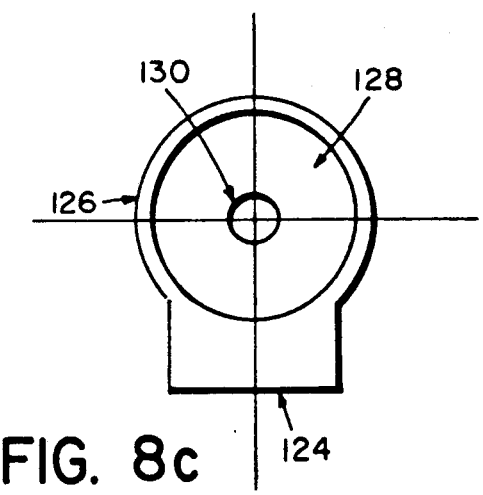
FIG. 8c
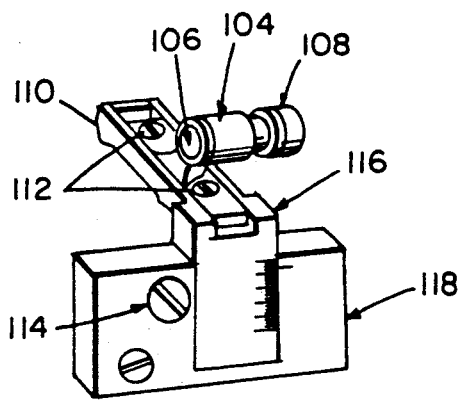
FIG. 8b
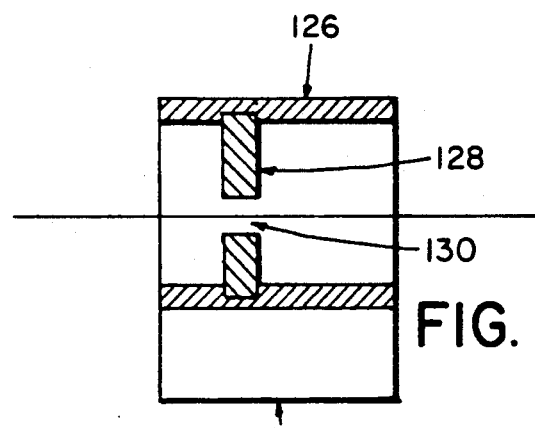
FIG. 8d
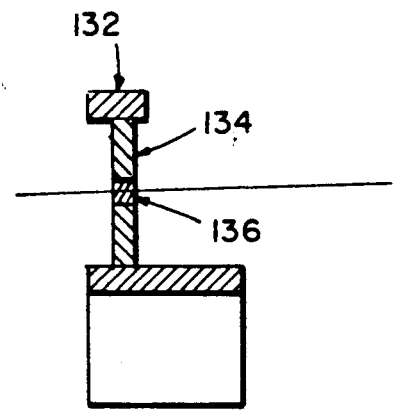
FIG. 8e
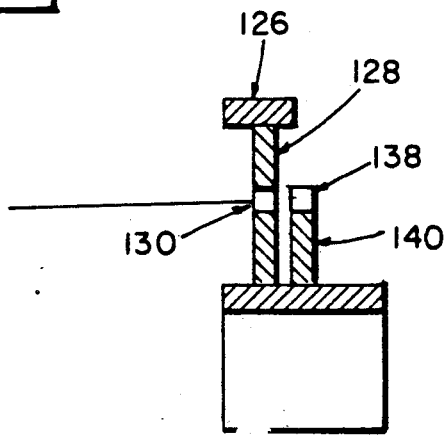
IG. 8f

TELEMICROSCOPIC APPARATUS FOR SIGHTING AND BI-LEVEL VIEWING

RELATED APPLICATION

This application is a continuation-in-part of co-pending U.S. Pat. application Ser. No. 07/134,794, filed Dec. 18, 1987 now U.S. Pat. No. 4,877,316.

BACKGROUND OF THE INVENTION

This invention relates to improvements in telemicroscopic apparatus previously disclosed and claimed in U.S. Pat. 4,540,238 to D. Brandon Edwards. The term "telemicroscope" applies to both telescopes and microscopes. In a preferred implementation of that telemicroscopic apparatus, a miniature telescope was mounted in a spectacle lens With a sufficiently small telescope mounted at about the optic axis of the lens, one can obtain bi-level viewing in which a principal image and a small magnified image can be viewed without confusion. Further details of the telemicroscopic apparatus of U.S. Pat. No. 4,540,238 are incorporated herein by reference.

DISCLOSURE OF THE INVENTION

In accordance with one feature of the invention, bi-level telemicroscopes are tilted relative to carriers Miniature telescopes have previously been mounted to spectacle lenses in accordance with the above-mentioned Edwards patent such that the telescope optic axis paralleled the expected viewing optic axis through the spectacle lens. Bi-level viewing was obtained by adjusting the fit of the spectacles to the user. It has been determined that bi-level viewing has been obtained by fitting the spectacles such that a tilt of the telescope is forced. This has resulted in an improper fitting of the principal spectacle lens. In accordance with the present invention, the telescope is mounted to the lens such that its optic axis is tilted relative to the proper principal optic axis of the spectacles. The end of the telescope closest to the eye is displaced furthest from that central line of sight. Thus, fitting of the spectacles having the miniature telescope is greatly simplified, and a better fit is obtained.

Essentially, from the wearer's point of view, the front end, or plus lens end, of the scope remains positioned just above the wearer's central line of sight while the rearward end, or negative lens end, of the scope is raised upward, thus inclining the scope's central axis to that central line of sight of the wearer below the scope. The magnification process which occurs within the scope lens system produces a bending of the bi-level rays emanating from the rear of the scope. This bending is away from the central axis of the scope. Bending of the magnified light rays necessitates tilting of the scope in order to project properly the magnified image onto the retina to create the vertical bi-level effect with the magnified field elevated slightly above the direct field of view. The tilt of the scope relative to the optic axis of the principal view should be equal to an apparent angle of about 10° divided by (m−1) where m is the magnification of the scope.

Within the barrels of such small diameter telescopes conditions exist such that the center axis of the barrel is necessarily quite close to the inside wall of the shaft of the barrel. The result is that light rays entering the telescope and striking the internal walls of the barrel are much more likely to be reflected back into the center of the barrel which, by necessity, is inordinately close to the walls. This reflected light hampers the nonreflected clear imagery light rays moving through the scope The consequence of this is a blurred, nondistinct magnified view. The most effective means of blocking and/or trapping the rays striking the barrel internal walls is to create fibers on the walls which project from these internal walls. The fibers can be made to vary in length and density, depending on the smallness of the internal diameter of the barrel shaft.

In certain tasks, bi-level magnification can be of value in enhancing unimpaired vision in the same manner as it does for impaired sight. Using the bi-level magnification mode, aircraft pilots with spectacle mounted bi-level scopes benefit greatly Military personnel with bi-level scopes in adaptors mounted to equipment such as Night Vision electron devices and M-16 rifles or other telescopes mounted on armament can greatly improve efficiency. The bi-level Galilean scopes work exceptionally well when adapted in line to the rear of other telescopes such as astronomical telescopes. The magnifications are multiplied. For example, a 4× bi-level miniature adapted in line or bi-level mode with a regular 4× telescope mounted on a rifle produces a 16× combination when viewing through the miniature and the regular scope at the same time. In the bi-level mode the regular 4× scope is still usable as such while just above center line of the regular 4× is the 16× capability through the miniature and the regular together. These miniatures can be adapted to almost any projectile firing weapon of military, law enforcement or sporting nature. Adapting these miniature scopes to motion picture and television equipment in a manner similar to that previously described is also feasible.

A novel sight having particular application as a gun sight comprises a Galilean telescope. The telescope provides a magnified view of a target past a target sight. The target sight may be a sight post or a spot centered within a window. The spot may be an aperture within a transparent sheet or a transparent spot of a first color centered within a transparent sheet of a second color. The telescope position may be adjustable in order to calibrate the sights.

When used as a gun sight, bi-level or in-line mode, the Galilean telescope should be mounted away from the eye to provide a field of view between 2° and 7°, preferably about 4°. An inner diameter of less than 13 mm provides the desired field of view. A length of less than 78 mm and outer diameter of less than 16 mm result in a lightweight scope which can be readily protected from impact. An outer diameter of less than about 16 mm allows for ready retrofit on conventional rifles and pistols.

A cylindrical barrel consisting of two threaded parts of the same outer diameter has been found to be a more advantageous design for these miniature telescopes With the threads of these two barrel halves located within the barrels approximately halfway between the two scope lenses, the user is still able to personally adjust the scope. The front or plus lens barrel may be threaded externally around the plus lens such that it may be screwed into a threaded spectacle lens in a manner similarly illustrated in the original Edwards patent or attached without threads using glue. This configuration is important because it eliminates the problem encountered when the negative lens barrel is accidentally adjusted too far forward and contacts the rear side of the plus lens The plus lens may be dislodged, damaging the scope unit. This design also allows for simple replacement of a damaged scope or simple interchange of different powered scopes using the same spectacle lens. Also, cap covers which may be provided are more easily cleaned and maintained in all use conditions than the lenses themselves with their curved surfaces, particularly the plus lens. A preferred telescope is presented in copending U.S. Pat. application No. 07/343,030, filed Apr. 25, 1989.

BRIEF DESCRIPTION OF THE DRAWINGS

The foregoing and other objects, features, and advantages of the invention will be apparent from the following more particular description of a preferred embodiment of the invention, as illustrated in the accompanying drawings in which like reference characters refer to the corresponding parts throughout the different views. The drawings are not necessarily to scale, emphasis instead being placed upon illustrating the principles of this invention.

FIG. 1 is a diagrammatical illustration of the side view of a spectacle mounted Bi-level Telemicroscopic Apparatus such that the tilt of the scope is shown.

FIGS. 2a and 2b diagrammatical illustrations of the tilted bi-level scope showing the paths of parallel rays of light, a normal nonmagnified ray below the scope and a bi-level ray passing through the scope.

FIG. 3 is an end view of a scope barrel which has hair-like fibers raised on the internal walls.

FIGS. 4a-4k are views of a small arms bi-level telescope adaptor.

FIGS. 5a-5e are views of a bi-level scope adaptor for electron devices, other telescopes or other equipment of a similar or different nature.

FIG. 6a is an exploded longitudinal section of a telescope barrel design, FIG. 6b is an optional cap, and FIG. 6c is a side view of a clip in the barrel.

FIG. 7a illustrates a miniature telescope mounted to an astronomical telescope, and FIG. 7b illustrates the reticle or cross wires as viewed through an astronomical aiming telescope with an additional horizontal wire component positioned to calibrate the miniature adapted bi-leveling scope FIGS. 8a-8f illustrate alternative gun sight arrangements.

DESCRIPTION OF PREFERRED EMBODIMENTS

This invention relates to the improvements realized when a miniature bi-level Galilean telescope 1 is tilted a particular way and amount in the spectacle carrier lens 2 before the eye of the wearer and relative to the wearer's line of sight 4. The result of this predetermined tilt alignment allows for the bi-level effect to be observed with minimal difficulty in fitting of the carrier to an individual. As can be seen in FIGS. 1 and 2, the forward end, or positive lens end, of the miniature, posterior, spectacle lens mounted scope 1 is positioned just above the wearer's straight forward line of sight 4. The rearward end of the telescope at eyelash length from the eyeball is raised upward slightly such that the scopes optic axis 5 is at an angle from the horizontal 7 as indicated at 8. Light rays of the bi-level magnified image's center are directed away from the central axis 5 of the telescope as they emerge from the scope. The magnified image enters the eye through the pupil and appears in the lower half of the retina upside down. Of course the retina observes the world upside down and the brain reorients the picture to make the world appear as it really is. In order to produce the alignment and or proper positioning of this image on the retina needed to achieve the bi-level orientation on the retina, the telescope must be tilted a particular amount as dictated by the power of the unit. The tilt of the scope causes a ray from the wearer's straight-ahead line-of-sight to enter the scope at a slight angle to its optic axis. Magnification by the scope then causes the same ray to emerge at a larger angle to the optic axis, resulting in a net downward bending of the ray. Thus, a proper degree of tilt of the scope can be used to position the magnified bi-level field at an angular location close to but not overlapping the direct vision field.

FIG. 1 illustrates the inclination or tilt of the telescope relative to the straight forward center line of sight of the eye. The tilting of the scope's central axis is important for establishing the bi-level effect. The primary reason for this tilt is to produce the required angle of the emerging rays relative to the center line or axis of the telescope. Through the magnification process, and because of the way the lenses bend the light rays entering and exiting the scope system, the rays exiting the negative lens of the scope are caused to be directed away from the central axis of the scope in a cone-like manner or in a fanning outward fashion. In order to aim these rays into the eye to obtain the bi-level effect and determine the border between the nonmagnified and magnified images, the rear of these miniature thin-walled telescopes must be moved upward relative to the horizontal while keeping the front positive lens end positioned just above the central line of sight of the eye through the carrier. Hence FIG. 2a and its blow-up 2b illustrate the path of a light ray which undergoes the magnification or light bending process.

FIGS. 2a and 2b illustrate what happens when two parallel rays of light, 4 and 7, approach the observer with one ray entering the telescope and one not. The ray 7, entering the scope is typical of all rays entering the scope. As a result of the light bending process which necessarily occurs with magnification, the bi-level ray 10 emerging from the scope is angled away from the central axis 5 of the scope. The required emergent ray at angle 9 must be produced by calculating and presetting the tilt down angle as follows:

$\phi$ = ray angle 9

$\alpha$ = ray angle 8 (angle between parallel ray 7 and scope axis = tilt down angle (TDA) of telescope)

Then $(\phi + \alpha) = m\alpha$ where m = magnification and $\phi = m\alpha - \alpha$ $= (m-1)\alpha$ $\phi$ = angle between incoming parallel ray 7 and outgoing bent ray 10 also $\phi$ = angular elevation of center of bi-level field

Hence, angular elevation of the bi-level field = (m − 1) (tilt down angle of the telescope)

$$\text{Or, tilt down angle} = \frac{\text{Angular elevation of bi-level field}}{(m-1)}$$

Another way of understanding angular elevation of the center of the bi-level field is to think in terms of the perspective of the scope wearer or user. Here angular elevation is the apparent angle between the straight line of sight just beneath the telescope and the center of the elevated bi-level field which comprises a magnified view of the straight line of sight. The apparent angle does not vary with the diameter of the scope and is designed to be approximately 10°, specifically in the range of 7° to 12°, in most applications.

For example, comparing a 4× telescope with a 5×:
Tilt down angle of scope=$\alpha$
angular bi-level field elevation=$\phi$ $$\alpha = \frac{\phi}{m-1}$$

For a 4× scope:

$$\alpha = \frac{10°}{4-1} = \frac{10°}{3} = 3.3°$$

∴ $\alpha = 3.3°$
For a 5× scope:

$$\alpha = \frac{10°}{5-1} = \frac{10°}{4} = 2.5°$$

∴ $\alpha = 2.5°$

Or as the scope power increases, the scope tilt down angle must be decreased accordingly.

This tilt down angle will vary from 2° to 10° ranging from 6× to 2× respectively. In practice, however, the angle may actually be 2° to 3° greater. These figures generally hold true as well for adaptor mounted telescopes such as those described below.

Recent years have seen many advances in optical technology. As a result of this technology the angular field of view, as well as the luminosity level emanating from these bi-leveling miniature scopes, can be considerably increased. Conic surfaced or aspheric positive and negative lens curves can now be matched in such a manner as to utilize more of the lens diameters to be employed in the passing of a clear magnified image. A result of this new capability is that the internal barrel diameters previously described in the earlier Edwards patent as about four or five millimeters at the smallest point can now be increased to eight or nine millimeters. Consequently, the field of view governed by the negative lens aperture and the brightness which under dim light conditions is governed largely by the aperture just behind the positive lens can be increased significantly. It must be noted, however, that these diameters must still remain relatively small so as to prevent the light level from being too bright, particularly for impaired vision individuals. As indicated previously, a few types of impaired vision retinal pathologies could take advantage of these larger internal apertures. Allowing for a larger internal diameter provides a wider shaft of light to emanate from the bi-leveling scopes. Here more still-functioning nerves at locations away from the macula (center) of the retina may be engaged for seeing magnified imagery, thus improving the patent's functional capability.

As described in the Edwards patent, for bi-level viewing the outer diameter of the scope should be no greater than about 10 mm. For adequate field of view and light transmission and to minimize the opaque ring surrounding the magnified bi-level image, the length should be no greater than about 16 mm.

The elimination of internally scattering reflected light rays from the barrel wall is essential for the proper function or operation of the bi-level miniature scopes. Because the walls of the barrel are very close to the center axis of the barrel, low-angle wall-reflected light even of small amounts easily crosses the paths of these nonreflected light rays traveling through the magnification system. The most effective means of achieving this end is by utilizing a fiber pattern 12 projecting from the barrel walls (FIG. 3). For best effectiveness these fibers should be approximately one to two tenths millimeters in length. This length effectively blocks and/or traps ray light striking the barrel walls. Once absorbed these blocked rays do not reflect toward the middle of the barrel to interfere with the bi-level rays moving unhampered through the system.

It has been found that bi-level telescopes are not limited in usefulness to vision impairment applications. Indications are that their application in areas where unimpaired vision would normally be required seem to be limitless. Several examples of heretofore unexpected successful application to normally sighted people as well as specialized instrumentation and vision enhancement equipment can be made.

As can been seen in FIGS. 4a–4k, the miniature bi-level scopes can be employed to enhance visual capability in the operation of a rifle such as the Colt Industries M-16 and AR-15 arms. In essence, the bi-level scope adaptor is attached by friction fit to the rear aperture sight mounted on the gun. The sighting mount known as the Iron Sight is used to aim the projectiles. The bi-level scope mounted and tilted as previously described serves as a verifier of the subject at which the gun is being aimed through the Iron Sight. The scope clips into the adaptor in the FIGS. 4a–4k illustrations. Also illustrated in FIGS. 4d and 4e are views of an inline Iron Sight mounted telescope adaptor fashioned similarly to the bi-leveling adaptor. In this mode, the user of the rifle may take direct advantage of magnification in aiming the projectile. Alternative adaptors are illustrated in FIGS. 4f–4j. No similar adaptor exists. Miniature telescope adaption to rifles is unique.

FIGS. 4a–4c describe a bi-level telescope adaptor designed to attach the scope to the M-16 and AR-15 Colt Industries rifle. This adaptor is approximately two inches in length. This design accommodates the need for seeing the widest field possible while at the same time allowing for rifle recoil with no injury to the eye. The scope 14 is tilted as seen in FIG. 4b. The scope mount clip 16 should be made of spring steel to hold fast the telescope to the adaptor. The adaptor arm 17 should be made of a hard durable metal such as gun metal or spring steel.

The attachment end 18 friction or pressure fits over the Iron Sight 20 at 22. The adaptor is bored at 24 to accommodate the aperture opening 26 of the Iron Sight 20. FIG. 4a is a top view of the adaptor. The Iron Sight end 18 of the metal adaptor arm 17 may be slightly modified to make possible the attachment of the adaptor arm 17 and clipped on scope 14 to any rifle, shot gun or other firearm.

FIGS. 4f–4h illustrate a more permanently attached version of the adaptor. The same basic application and adaptor form are used to screw anchor the telescope 28 in the adaptor at 30. And, the adaptor itself is screw anchored to the Iron Sight by means of a threaded stud 32 which screws into the adaptor at 34 and into the Iron Sight once the adaptor is attached over the Iron Sight.

In order to take advantage of the miniature scope magnification for directly aiming the rifle, an in-line scope and adaptor mode is easily demonstrated in FIGS. 4d–4j. As can be seen in FIGS. 4d and 4e, the adaptor is similar in structure to the bi-level mode adaptor; however, here the telescope is attached to the adaptor at 36 in front of and directly in line with the center bore 26 of the Iron Sight 20. The adaptor is attached to the Iron Sight 20 in the same manner as the bi-level mode adaptor of FIGS. 4a–4e. This adaptor is attached with a pressure fit and is relatively simple to remove. FIGS. 4a and 4j denote a more permanently attached adaptor Here, as with the bi-level mode permanent adaptor, the telescope is thread mounted to the adaptor at 38, and the adaptor 39 is stud 40 thread mounted to the Iron Sight by the threaded stud 40 as illustrated.

The miniaturization of the telescope necessary for bi-level viewing offers further advantages in its application to a weapons sight in both the bi-level and inline applications. The Iron Sight is mounted in a U-shaped channel for protection and may be moved left or right within the channel to accommodate the shooter's individual aiming idiosyncrasies. This protective channel is generally about 11 mm–16 mm wide. Therefore, for convenient retrofit the telescope should be no wider than the Iron Sight itself, or about 16 mm. In general, a smaller scope is more easily protected from damaging impact than are the more conventional larger scopes. The scope is best protected if its outer diameter is less than about 16 mm and its length is less than about 78 mm.

The small scope, which is both lighter weight and more readily protected than conventional scopes, is possible due to the use of a Galilean telescope rather than the conventional astronomical scope. The astronomical scope requires a longer optical path within the lens system and also may require prisms to provide an upright image. A conventional astronomical scope mounted to a weapon is 6" to 8" long and has an outer diameter of from 1" to 1 ½". A typical scope provides a 7° field of view. The astronomical scope does have the advantage of allowing a crosshair to be provided.

Because the Galilean scope does not provide for crosshairs, aiming through an in-line scope is facilitated by a scope having a more narrow field of view than conventional scopes. The user can readily center the view of the sight post 37 (FIG. 4K) at the far end of the weapon 39 within the small image of narrow field of view. Approximately 4° has been found to be suitable. On the other hand, too small a field of view restricts the user's ability to see past the sight post and to recognize the object at which he is aiming through the scope. Therefore, the field of view should be within the range of 2° to 7°. The scope on the weapon is typically spaced about three inches from the user's eye. This distance reduces the field of view. Therefore, to provide an actual field of view of about 4°, the scope itself should have a field of view of about seven times that. The field of view of the scope is about equal to the inner diameter of the scope at the negative lens divided by the distance between the lenses times 57°. For a suitable field of view, scope is placed three inches from the user's eye and the length of the scope is less than 78 mm. If the scope is to be placed further from the user's eye, the internal diameter should be increased somewhat to maintain the preferred field of view.

A further consideration in designing the size of the sight scope is that to maintain a long depth of field, short focal lengths of the lenses are preferred. Also, scope power of about two to four times is preferred.

General equations for designing the scope include the following:

$f_n \times \text{Power} = f_p$ $2 \times (r-1) \times f_n = R_n$ for a symmetric biconcave lens $(r-1) \times f_n = R_p$ for a planoconvex lens $f_p - f_n \doteq$ distance between lens centers where f is the focal length, R is the radius of curvature, r is the refractive index of the glass or plastic, and the subscripts n and p indicate the negative and positive lenses, respectively.

A preferred four-power scope for use in either bi-level or in line viewing on a weapon has a 6 mm inner diameter and is about 14.5 mm long. The negative and positive lenses have radii of curvature of −4.5 and +8.8, respectively. The scope provides a 4° field of view when spaced three inches from the user's eye.

FIGS. 8a–8f illustrate alternative adaptations of the miniature telescope to the aiming mechanism of small arms. The scopes very naturally adapt themselves to what is commonly referred to as a rifle or shot gun receiver sight. In FIG. 8a, the modified receiver sight is illustrated at 100 on a rifle 101, and a target sight discussed below is illustrated at 102.

FIG. 8b illustrates the modified receiver sight from the back side of FIG. 8a. Here the front 104 of the commercially produced receiver sight part is modified to accept a miniature telescope plus lens 106 and internal threading to accept the rear or negative lens barrel 108. The negative lens barrel is made of any lightweight material, such as aluminum or nylon, and its outer diameter is knurled for easy turning. The telescope rests in its slot atop the arm or collar portion 110 of the receiver sight. The left/right position of the telescope on the arm 110 may be adjusted by adjustment screws 112. The arm itself may be raised or lowered to calibrate for distance by a calibration screw 114 which allows vertical movement of a slide 116 in the receiver mounting plate 118. The receiver sight is attached by the plate 118 to the receiver of the rifle, shot gun, or pistol.

This modified miniature receiver sight scope, which may be of different powers, is used in conjunction with the already commercially produced "end barrel" target sight. These two units in combination may now be used to calibrate the aim of the small arm for the desired target distance. These two units, receiver sight telescope and end barrel target sight, allow the straight line of sight 120 through them to be paralleled or angled to the central bore of the gun barrel 122 for variable distance targeting.

FIGS. 8c and 8d illustrate a common commercially produced end barrel target sight. This unit comprises a mounting base 124 and barrel or ring configuration 126. Within the barrel or ring is anchored a clear, transparent, colored disc 128. The color may vary from amber to clear to hunters yellow depending on environmental conditions At the center of the disc is a hole 130 of small diameter The contrast between the brighter light hole and the colored disc is readily discernible by the gun user, and the hole can be used for calibration of the gun. The diameter of the hole can vary depending on the distance of the target and the accuracy required. These hole diameters will generally range from 1 mm to 6 mm in a disc of 6 mm to 16 mm. At 12 mm, the 4°–5° field of view of the telescope closely matches the window of the target sight. The tube length would typically be about 25 mm, but it has been found that shorter lengths such as about 3 mm are preferred.

FIG. 8e illustrates an alternative target sight in which a shorter barrel 132 supports a disc 134. The main portion of the disc is of one color such as gray, and a center portion 136 is of a second color such as hunters yellow to provide a sight spot.

FIG. 8f illustrates a target sight like that in FIG. 8d except that a small, circular mass 138 is supported on a thin strut 140 behind the aperture. In this case, the piece 138 might again be hunters yellow, and the disc 128 might be gray.

FIGS. 5a–5c illustrate a multi-purpose adaptor design or configuration. This adaptor can accommodate equipment which utilize electron activated viewing screens such as television type screens, as well as Night Vision equipment made by numerous companies. FIG. 5c shows the adaptor 42 with bi-level scope mounted to the rear eye piece of a Night Vision scope 44 such as the PVS-5 now being used in the military. Again, the same bi-leveling principles previously described apply. As can be seen in FIG. 5a, the adaptor 42 itself comprises three major components: a tubular structure 46 made of plastic or metal (plastic being preferred because of its light weight) and components 48 and 50 which are clear plastic discs for easy viewing of both the Night Vision scope screen and the magnified bi-level of it. Disc 48 holds the bi-leveling scope 52 at the prescribed tilt down angle 54. Both discs 48 and 50 are pressure fitted within the tubular structure. FIG. 5b is an in-line view through the adaptor. In addition, as can be seen in FIGS. 5d and 5e, a similarly constructed adaptor 56 can be made to fit over the front lens housing of the same type of electron devices such as television cameras and Night Vision equipment. Here the mode may be bi-level or, as illustrated, directly in line for adaption to Night Vision equipment. The rear adaptor with telescope previously discussed may also have the scope placed in-line.

It can also be demonstrated that a slight variation of this FIGS. 5a–5e adaptor, such as a change in inner or outer diameters, would allow the adaption to another larger telescope of the Galilean or Astronomical type. The result of this type of adaption illustrated in FIG. 7a is two-fold. In the bi-level mode the larger scope 60, such as those used on hunting rifles, retains its original power while in the bi-leveling miniature view the powers of the two scopes 52, 60 are multiplied Both powers, the original and the added power, are available for viewing at the same time. In this combination also, the reticle 62 (or cross hairs) in the astronomical scope is also seen in the Galilean bi-level.

In order to fully take advantage of this unique combination of scopes as illustrated in FIG. 7a, the two units must be calibrated both with each other and independently of each other. The two scope powers operating together in a multiplied power fashion offer the capability of accurately aiming the projectile at two different distances. The conventional astronomical telescope has a closer range calibration while the combination of the miniature and conventional scopes has a more distant range calibration for accurately striking the target. This is accomplished by adding a second horizontal crosswire 58 above the original one 62 in the conventional scope (FIG. 7b). Aiming through both scopes with this higher crosswire brings the firearm barrel end upward, thus allowing the projectile to fly further before hitting the ground or the target at a greater distance. Hence, if the conventional scope crosswire, or reticle, is calibrated to allow the projectile to accurately hit a target at 500 yards, then the miniature/conventional magnification combination and upper crosswire could be calibrated for a longer distance, for example 750 yards.

In addition, the miniature/conventional combination may be used in the bi-level mode using the conventional reticle only.

The uniquely designed cylindrically adjustable constant outer diameter telescope barrel of FIG. 6a–6b proves to hold many advantages over previously illustrated barrel shapes or configurations. As denoted in FIG. 6a, the barrel structure consists primarily of two components 64 and 66. Each component is countersunk so as to accommodate the insertion of a plus lens as shown at 68 and a negative lens at 70°. The two lenses form a Galilean telescope in that the plug lens is a convergent objective and the spaced negative lens is a divergent eyepiece. The threading structure at 72 and 74 is located approximately halfway between the two lenses. The negative lens 70 is friction press-fitted into its resting position of barrel 66. The plus lens 68 is loosely fitted into its countersunk position and either glued onto barrel 64 or is held fast by a thin (0.5 mm thick) spring steel wire "C" spring 71. The wire spring is stretched open so as to allow for a tight friction pressure fit on barrel 64. Threads at 78 allow the barrel 64 to be coupled to a carrier such as a spectacle lens. Alternatively, in FIG. 6b, a clear cap cover 73 threaded internally and externally at 74 and 76, respectively. may also be used to not only seal the plus lens 68 at 78 but to also function as a securing agent for the plus lens to hold it fast in the countersunk position. Also for added sealing protection, particularly if there is a need to make the scope air or moisture tight, an adhesive-like plastic or rubber like round or ring gasket can be placed at 80 just behind the plus lens or diagrammatically to the right of the plus lens within its countersink hole. The same type gasket can be used to double seal the negative lens in a similar fashion The internal diameter of these new scopes ranges up to approximately 9 mm.

We claim:

1. A gun having sights, the sights comprising a Galilean telescope and a target sight, the telescope having an outer diameter of less than about 16 mm. and being adapted to be spaced from a user's eye to sight and provide a magnified image of an object past the target sight.

2. A gun as claimed in claim 1 wherein the telescope has a length of less than about 78 mm.

3. A gun having sights, the sights comprising a Galilean telescope and a target sight, the telescope being adapted to be spaced from a user's eye to sight and provide a magnified image of an object past the target sight and to provide a field of view within the range of about 2° to 7°.

4. A gun as claimed in claim 3 wherein the telescope is adapted to provide a field of view of about 4°.

5. A gun having sights, the sights comprising a Galilean telescope and a target sight, the telescope having an internal diameter of less than about 13 mm. and being adapted to be spaced from a user's eye to sight and provide a magnified image of an object past the target sight.

* * * * *